3,231,391
INSTANT PUDDING COMPOSITION CONTAINING AN ACETYLATED MONOGLYCERIDE OF A HIGHER FATTY ACID
Orville N. Breivik, Westport, Conn., William Slupatchuk, Flushing, N.Y., and Robert J. Carbonell and Gilbert Weiss, Stamford, Conn., assignors to Standard Brands Incorporated, New York, N.Y., a corporation of Delaware
No Drawing. Filed Aug. 14, 1962, Ser. No. 216,736
14 Claims. (Cl. 99—139)

This invention relates to the preparation of an instant pudding, and more particularly to a composition which when combined with cold milk will, within a relatively short period of time, result in a pudding having characteristics similar to those of a cooked starch pudding.

Instant pudding mixes are being marketed today which employ a pulverulent thickening agent (pregelatinized starch) in combination with phosphate gelling systems which serve to gel milk added to the mix. One such phosphate milk gelling system is described in U.S. Patent No. 2,801,924 to Clausi et al. This system employs an alkali pyrophosphate such as a tetra-alkali pyrophosphate as a coagulant and an alkali orthophosphate as a coagulation accelerator. Another phosphate mix presently on the market is that described in U.S. Patent No. 2,607,692 to Kennedy et al. This system employs a tetra-alkali pyrophosphate as the coagulant with a soluble calcium salt as a coagulation accelerator. In such desserts the phosphates serve to rapidly gel the milk protein while the pregelatinized starch or other stiffening agent serves to hydrate rapidly and thereby thicken the delicate gel system so that in a matter of minutes it assumes a texture approaching that of a cooked starch pudding.

In the preparation of the pudding the housewife is likely to employ rapid mechanical agitation in hydrating the dry mix ingredients with the milk. She usually chooses to employ cold milk in preparing the instant pudding and it is quite often the case that the mix solution foams during whipping. As a result of the rapid onset of gelation this foaming produces an unattractive pebbly surface on the dessert; in addition, the texture of the dessert product assumes a somewhat aerated condition less like that of a cooked starch pudding. Hence, for many dessert users this aerated dessert texture is less appealing to the palate.

The above mentioned U.S. Patent No. 2,801,924 discloses the incorporation of a vegetable oil in instant pudding mixes as a foam depressant. According to Patent No. 2,901,355, such oils do reduce in part the foaming tendency of instant pudding mixes, but they are effective only when certain manufacturing and recipe conditions are adhered to. Consequently they leave much to be desired.

The said Patent No. 2,901,355 proposes to avoid the shortcomings of the edible oils as foam depressants by incorporating in the instant pudding mix, in addition, a hydrophilic lipin dissolved in what is termed "a dry-to-the-touch free-flowing readily dispersible granular shortening." The hydrophilic lipins are generally partial fatty acid esters of water-soluble hydroxy substances such as glycerol, sugars and hydroxy carboxylic acids.

Another instant pudding mix presently on the market contains lecithin. We have found that lecithin will function as a foam depressant under certain conditions when used in the proper amount in an instant pudding mix. However, to obtain satisfactory results certain mixing conditions must be adhered to during compounding of the dry mix and the foam depressing action of the lecithin is reduced considerably on storage of mixes containing it. Lecithin also has the disadvantage that it may impart an off taste to the pudding.

An object of the present invention is to provide a dry instant pudding mix which can be mixed with cold milk to produce a pudding dessert having characteristics similar to those of a cooked starch pudding.

A further object of the present invention is to provide a dry instant pudding mix which can be combined with cold milk to give a pudding dessert which has a smooth surface and does not have an aerated or spongy texture.

The instant pudding composition of the present invention comprises a phosphate milk protein coagulating agent, a pudding stiffening agent and an acetylated monoglyceride of a higher fatty acid. Preferably the composition also contains a coagulation accelerator. Suitable examples of such acetylated compounds are those sold by the Eastman Kodak Company under the trade names Myvacet 9–40, Myvacet 9–85, Myvacet 7–00, Myvacet 7–15 and Myvacet 5–00. These preparations are made by acetylating monoglycerides of fatty acids derived from edible fats or oils. The monoglycerides may be prepared by superglycerinating animal or vegetable fats or oils and then distilling the product so obtained. Myvacet 9–40 is derived from prime lard, Myvacet 9–85 from cottonseed oil, Myvacets 5–00 and 7–00 from hydrogenated lard, and Myvacet 7–15 from hydrogenated and unhydrogenated edible animal fats.

The 9–40 and the 9–85 preparations are essentially completely acetylated, the 7–00 and the 7–15 preparations are about 70% acetylated and the 5–00 preparation is about 50% acetylated. The 9–40 and 9–85 preparations are liquid at room temperature and are preferred because they can be uniformly dispersed in the dry pudding mix with greater ease and also appear to disperse more readily when the dry pudding mix is combined with cold milk. The other Myvacet preparations mentioned above are solid at room temperature and appear to be less readily dispersible in the dry pudding mix as well as in the cold milk. The dispersibility of these solid Myvacet preparations can be improved by combining them first with an edible oil, such as corn oil, or with a hydrophilic lipin emulsifier or both, before incorporating them in the dry mix or ingredients thereof.

Small amounts of the acetylated monoglycerides, usually less than 1% based on the weight of the dry instant pudding mix, are sufficient to give the desired foam depressant effect. Larger quantities may be used but do not appear to give any better result. The acetylated monoglycerides are stable, do not impart off flavors to the pudding and do not suffer substantial loss of their foam depressant effect on storage of the pudding mix.

By employing a small amount of a hydrophilic lipin emulsifier along with the acetylated monoglyceride, smaller amounts of the latter may be used to obtain substantially the same result as that obtained with larger amounts of acetylated monoglycerides employed alone.

The hydrophilic lipin emulsifiers which may be used in the present invention are generally partial fatty acid esters of water-soluble, hydroxy substances such as glycols, glycerols, sugars, sorbitol and other sugar alcohols and hydroxy carboxylic acids. Suitable examples of such emulsifiers are the monoglycerides, diglycerides, phosphatides, and polyoxyethylene sorbitan mono fatty acid esters. Phosphatides, for instance lecithin, are usually sold in the form of a dispersion in a vegetable oil such as soybean oil. Such a dispersion may be used in the present invention.

The hydrophilic lipin emulsifiers are employed in small amounts usually less than 1% of the weight of the dry instant pudding mix.

The milk coagulation agent may be one of a number of phosphates such as a di-alkali, tri-alkali, or tetra-alkali pyrophosphate or an alkali tri-polyphosphate such as the sodium salt ($Na_5P_3O_{10}$). The tripoly- and pyrophosphates could also be used in combination as milk coagulation agents. The coagulation acceleration agent employed can be an alkali orthophosphate such as di-sodium di-hydrogen orthophosphate or monocalcium orthophosphate. Instead of the orthophosphates, water-soluble calcium salts such as calcium acetate can be employed as a coagulation accelerator in combination with the phosphate milk coagulator. It is also possible to employ a number of these coagulation accelerators in combination such as di-sodium di-hydrogen orthophosphate together with calcium acetate. Although pregelatinized starch is preferred as the gel stiffening agent, other thickeners can be employed; such alternative stiffening agents are starch derivatives, natural gums and modifications thereof, hydrophilic colloids derived from sea plants, cellulose derivatives and the like. Suitable examples of natural gums are guar gum and locust bean gum. Suitable examples of hydrophilic colloids derived from sea plants are the alginates and carrageenans.

Sucrose and other sugars are preferably employed along with various flavoring and coloring ingredients in the dry mix to suit popular taste.

Specific examples of the composition of the present innvention are set forth in the following table.

| Components in grams | Vanilla | Vanilla | Chocolate | Chocolate | Vanilla | Vanilla | Vanilla |
| --- | --- | --- | --- | --- | --- | --- | --- |
| Sucrose | 78.3 | 78.3 | 77.0 | 77.0 | 77.6 | 77.2 | 77.2 |
| Pregelatinized Starch | 16.7 | 16.7 | 20.0 | 20.0 | 16.7 | 16.7 | 16.7 |
| Cocoa | | | 13.0 | 13.0 | | | |
| Salt | 0.6 | 0.6 | 1.0 | 1.0 | 0.7 | 0.7 | 0.7 |
| Tetrasodium Pyrophosphate | 2.2 | 2.2 | 1.85 | 1.85 | 2.2 | 2.2 | 2.2 |
| Calcium Acetate | | | 1.20 | 1.20 | | | |
| Monocalcium Phosphate | 1.6 | 1.6 | 0.5 | 0.5 | 1.6 | 1.6 | 1.6 |
| Myvacet 9-40 | 0.6 | | | 0.25 | | | |
| Myvacet 9-85 | | 0.6 | 0.2 | | | | |
| Myvacet 7-15 | | | | | 0.6 | | |
| Myvacet 7-00 | | | | | | 0.6 | |
| Myvacet 5-00 | | | | | | | 0.6 |
| Myverol 18-98 | | | 0.35 | | | | 1.0 |
| Commercial Lecithin | | | | 0.20 | | | |
| Corn Oil | | | | | 0.6 | 1.0 | |

The Myverol 18–98 used in the foreging table is a monoglyceride derived from safflower oil, sold by Distillation Products Industries, which has a monoester content of about 90%.

If desired, dried milk solids may be included in the instant pudding mix in which case the pudding may be prepared by combining the mix with water rather than milk.

To prepare the dry mix the constituents thereof are simply mixed together thoroughly. Thorough incorporation of the foam depressant may be facilitated by first mixing it thoroughly with a portion of the sugar, for instance about 15%, in the form of granulated sugar. This may be done for instance in a ribbon mixer. If edible oils or emulsifiers are employed, they are preferably first blended with the acetylated monoglyceride and the blend then applied to the granulated sugar. The resulting mixture is then blended with the remaining components of the dry mix to form a homogeneous composition.

To produce the pudding, a dry composition as set forth in the above table is added to one pint of milk chilled to a temperature of about 50° F. and the mixture is agitated with an egg beater for about one minute. The mixture sets up in about five to ten minutes to a product having a smooth surface and uniform consistency.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A composition for use in preparing an instant pudding comprising a phosphate milk protein coagulating agent, a pudding stiffening agent and a small amount of an acetylated monoglyceride of a higher fatty acid sufficient to substantially reduce the amount of foaming when the composition is whipped with cold milk.

2. A composition as claimed in claim 1 containing, in addition, a coagulation accelerator.

3. A composition as claimed in claim 2 wherein the stiffening agent is pregelatinized starch.

4. A composition as claimed in claim 2 wherein the acetylated fatty acid monoglyceride is a liquid at room temperature.

5. A composition as claimed in claim 2 wherein the acetylated fatty acid monoglyceride is a liquid at room temperature and is derived from an animal fat.

6. A composition as claimed in claim 2 wherein the acetylated fatty acid monoglyceride is a liquid at room temperature and is derived from a vegetable oil.

7. A composition for use in preparing an instant pudding comprising tetrasodium pyrophosphate, monocalcium phosphate, pregelatinized starch and a small amount of an acetylated monoglyceride of a higher fatty acid sufficient to substantially reduce the amount of foaming when the composition is whipped with cold milk.

8. A composition for use in preparing an instant pudding comprising tetrasodium pyrophosphate, disodium dihydrogen orthophosphate, pregelatinized starch and a small amount of an acetylated monoglyceride of a higher fatty acid sufficient to substantially reduce the amount of foaming when the composition is whipped with cold milk.

9. A composition as claimed in claim 2 containing, in addition, a hydrophilic lipin emulsifier.

10. A composition as claimed in claim 2 containing, in addition, a phosphatide.

11. A composition as claimed in claim 2 containing, in addition, lecithin.

12. A composition as claimed in claim 2 containing, in addition, a monoglyceride of a higher fatty acid.

13. A composition for use in preparing an instant pudding comprising a phosphate milk protein coagulating agent, a pudding stiffening agent and a foam depressant, the foam depressant consisting essentially of a small amount of an acetylated monoglyceride of a higher fatty acid sufficient to substantially prevent foaming when the composition is whipped with cold milk.

14. A composition for use in preparing an instant pudding comprising a phosphate milk protein coagulating agent, a pudding stiffening agent and a foam depressant, the foam depressant consisting essentially of a small amount of an acetylated monoglyceride of a higher fatty acid and a hydrophilic lipin emulsifier sufficient to substantially prevent foaming when the composition is whipped with cold milk.

References Cited by the Examiner

UNITED STATES PATENTS 2,402,690  6/1946  Stanley _____ 99—123
2,614,937  10/1952  Baur et al. _____ 99—118
2,901,355  8/1959  Bangert et al. _____ 99—139

A. LOUIS MONACELL, *Primary Examiner.*

BEATRICE H. STRIZAK, *Examiner.*